(12) United States Patent
Wang

(10) Patent No.: US 8,750,596 B2
(45) Date of Patent: Jun. 10, 2014

(54) SYSTEM AND METHOD FOR IDENTIFYING DEFECTS IN A MATERIAL

(75) Inventor: Xiaoguang Wang, Alpharetta, GA (US)

(73) Assignee: Cognex Corporation, Natick, MA (US)

( * ) Notice: Subject to any disclaimer, the term of this patent is extended or adjusted under 35 U.S.C. 154(b) by 116 days.

(21) Appl. No.: 13/213,993

(22) Filed: Aug. 19, 2011

(65) Prior Publication Data

US 2013/0044936 A1    Feb. 21, 2013

(51) Int. Cl.
*G06K 9/62* (2006.01)
(52) U.S. Cl.
USPC ........................................................ 382/149
(58) Field of Classification Search
None
See application file for complete search history.

(56) References Cited

U.S. PATENT DOCUMENTS

| | | | |
|---|---|---|---|
| 5,367,174 A * | 11/1994 | Bazile et al. | 250/559.45 |
| 6,028,948 A * | 2/2000 | Kil et al. | 382/108 |
| 2005/0252545 A1 | 11/2005 | Nowlan et al. | |
| 2009/0238444 A1 | 9/2009 | Su et al. | |
| 2010/0177191 A1* | 7/2010 | Stier | 348/92 |
| 2011/0025839 A1 | 2/2011 | Trupke et al. | |

OTHER PUBLICATIONS

Tsai et al., "Micro-crack inspection of heterogeneously textured solar wafers using anisotropic diffusion", Image and Vision Computing 28 (2010), pp. 491-501, Elsevier.*
Zhuang et al., "Solar Cell Crack Inspection by Image Processing", IEEE Publication, 2004, pp. 77-80.*

* cited by examiner

*Primary Examiner* — Brian P Werner

(57) ABSTRACT

Described are computer-based methods and apparatuses, including computer program products, for identifying defects in a material. A set of features is identified based on an image of a material, wherein each feature in the set of features is a candidate portion of a defect in the material. A set of chained features is selected based on the set of features, wherein each chained feature comprises one or more features that represent candidate portions of a same defect in the material. A defect in the material is identified based on the set of chained features and the image.

12 Claims, 6 Drawing Sheets

SYSTEM AND METHOD FOR IDENTIFYING DEFECTS IN A MATERIAL

FIELD OF THE INVENTION

The present invention relates generally to computer-based methods and apparatuses, including computer program products, for identifying defects in a material.

BACKGROUND

Automated manufacturing processes can be used to quickly and efficiently manufacture materials in mass quantities. For example, silicon-based wafers and solar cells can be manufactured using automated fabrication lines. While such manufacturing processes can yield significant quantities of materials, it is often important to inspect the end product for quality assurance and/or process control because the revenue realized by the fabrication plant is often directly related to the quality of the end product (or material). Therefore, a key factor for high quality manufacturing processes is often a high speed and high precision inspection apparatus for testing and screening the end product of the manufacturing process.

For example, for solar cells, the conversion efficiency (how efficient the PV system is at converting sunlight into electrical energy) often has a direct influence of the output of electrical power. Therefore, solar cell manufacturers want to attain higher conversion efficiency through their fabrication lines, because selling prices are related to conversion efficiency. As a result, solar cell manufacturers can employ an inspection apparatus to test solar cells for sufficient conversion efficiency.

Manufacturers can use computer vision to inspect fabricated materials and/or products. However, many manufactured materials do not have uniform surfaces, which often makes inspection of such materials (e.g., for defects such as cracks) using computer vision difficult. For example, polycrystalline solar cells are often made up of heterogeneous textures and confusing features. Therefore, defects in polycrystalline solar cells, such as cracks, often have a non-uniform appearance (e.g., non-uniform contrast, polarity, width, etc.). Further, portions of such defects can often have very low contrast (e.g., 1-2 gray levels).

Present material inspection systems that are configured to detect hard-to-identify defects often use high-resolution images to expose the defects. However, using high-resolution images is more data-intensive, and therefore requires more time for each inspection.

SUMMARY OF THE INVENTION

One approach to detecting defects of a material using machine vision (e.g., cracks on a polycrystalline solar cell) is to first detect strong features of the defects (e.g., features that can be easily identified in an image of the material with a relatively high degree of certainty, such as large and easily identifiable portions of a crack), and to then use the strong defect features to guide the search for weak features of the defects (e.g., features that are more difficult to identify, such as small and thin (e.g., hairline) portions of a crack).

In one aspect, a computerized method is featured for identifying a defect in a material. The method includes generating, by a computing device, a preprocessed image based on an original image of a material. The method includes dividing, by the computing device, the preprocessed image into a set of sub-images. The method includes for a first sub-image in the set of sub-images, determining, by the computing device, whether the first sub-image includes a feature, wherein the feature is a candidate portion of a defect in the material, and if the first sub-image includes the feature, adding, by the computing device, the first sub-image to a set of feature sub-images. The method includes selecting, by the computing device, a chained feature based on the set of feature sub-images, wherein the chained feature comprises one or more features that represent candidate portions of a same defect in the material. The method includes identifying, by the computing device, a defect in the material based on the chained feature and the original image, comprising calculating a remaining portion of the defect based on the chained feature.

In another aspect, a computer program product is featured, tangibly embodied in a non-transitory computer readable medium. The computer program product includes instructions being configured to cause a data processing apparatus to generate a preprocessed image based on an original image of a material. The computer program product includes instructions being configured to cause a data processing apparatus to divide the preprocessed image into a set of sub-images. The computer program product includes instructions being configured to cause a data processing apparatus to, for a first sub-image in the set of sub-images, determine whether the first sub-image includes a feature, wherein the feature is a candidate portion of a defect in the material, and if the first sub-image includes the feature, add the first sub-image to a set of feature sub-images. The computer program product includes instructions being configured to cause a data processing apparatus to select a chained feature based on the set of feature sub-images, wherein the chained feature comprises one or more features that represent candidate portions of a same defect in the material. The computer program product includes instructions being configured to cause a data processing apparatus to identify a defect in the material based on the chained feature and the original image, comprising calculating a remaining portion of the defect based on the chained feature.

In another aspect, an apparatus is featured for identifying a defect in a material. The apparatus includes a preprocessing module configured to generate a preprocessed image based on an original image of a material. The apparatus includes a strong feature detection module in communication with the preprocessing module configured to divide the preprocessed image into a set of sub-images. The strong feature detection module is further configured to, for a first sub-image in the set of sub-images, determine whether the first sub-image includes a feature, wherein the feature is a candidate portion of a defect in the material, and if the first sub-image includes the feature, add the first sub-image to a set of feature sub-images. The apparatus includes a weak feature detection module in communication with the strong feature detection module configured to select a chained feature based on the set of feature sub-images, wherein the chained feature comprises one or more features that represent candidate portions of a same defect in the material. The weak feature detection module is configured to identify a defect in the material based on the chained feature and the original image, comprising calculating a remaining portion of the defect based on the chained feature.

In another aspect, a computerized method is featured for identifying a defect in a solar cell. The method includes identifying, by the computing device, a set of features based on an image of a solar cell. The solar cell includes a plurality of textures, and each feature in the set of features is a candidate portion of a defect in the solar cell. The method includes selecting, by the computing device, a set of chained features based on the set of features, wherein each chained feature comprises one or more features that represent candidate portions of a same defect in the solar cell. The method includes identifying, by the computing device, a defect in the solar cell based on the set of chained features and the image.

In another aspect, a computer program product is featured, tangibly embodied in a non-transitory computer readable medium. The computer program product includes instructions being configured to cause a data processing apparatus to identify a set of features based on an image of a solar cell. The solar cell includes a plurality of textures, and each feature in the set of features is a candidate portion of a defect in the solar cell. The computer program product includes instructions being configured to cause a data processing apparatus to select a set of chained features based on the set of features, wherein each chained feature comprises one or more features that represent candidate portions of a same defect in the solar cell. The computer program product includes instructions being configured to cause a data processing apparatus to identify a defect in the solar cell based on the set of chained features and the image.

In another aspect, an apparatus is featured for identifying a defect in a solar cell. The apparatus includes a strong feature detection module configured to identify a set of features based on an image of a solar cell. The solar cell comprises a plurality of textures, and each feature in the set of features is a candidate portion of a defect in the solar cell. The apparatus includes a weak feature detection module in communication with the strong feature detection module configured to select a set of chained features based on the set of features, wherein each chained feature comprises one or more features that represent candidate portions of a same defect in the solar cell. The weak feature detection module is configured to identify a defect in the solar cell based on the set of chained features and the image.

In other examples, any of the aspects above can include one or more of the following features. Generating the preprocessed image can include generating a filtered image, comprising removing one or more features using a filter, and generating the preprocessed image by subtracting the filtered image from the original image to expose the one or more features in the original image. The preprocessed image can be the original image. The preprocessed image can expose one or more features of the material. The preprocessed image can include dark pixels and light pixels, wherein the dark pixels and the light pixels are identified based on a grey-level threshold.

In some examples, determining whether the sub-image includes the feature includes executing a line fitting algorithm using the light pixels, the dark pixels, or both, in the sub-image. It can be determined whether the feature satisfies a first set of criterions, and it can be determined whether the chained features and the calculated remaining portion of the defect satisfy a second set of criterions.

In other examples, selecting the chained feature includes selecting a feature sub-image from the set of feature sub-images, identifying one or more sub-images that border the selected feature sub-image, each identified sub-image including a feature, and generating a chained feature comprising the selected feature sub-image and a sub-image from the one or more identified sub-images based on one or more constraints. The one or more constraints can include a position, an orientation, or both, of the one or more features.

In some examples, identifying the defect includes selecting a pair of chained features comprising the chained feature, determining if the pair of chained features satisfies a first criterion indicative of the pair of chained features being on a same defect in the material, and calculating a remaining portion of the same defect between the pair of the chained features. The first criterion can be based on a distance between the pair of chained features, an end direction of each feature in the pair of chained features, a turning angle of each feature in the pair of chained features, a length of each feature in the pair of chained features, or any combination thereof.

In other examples, identifying the set of features includes generating a preprocessed image, based on the image, to (a) remove one or more textures of the plurality of textures of the solar cell in the image, or (b) expose one or more features of a defect in the plurality of textures, or both. The preprocessed image can be divided into a set of sub-images. For one or more of the sub-images in the set of sub-images, it can be determined whether the sub-image includes a feature, wherein the feature is a candidate portion of a defect in the solar cell. If the sub-image includes the feature, the sub-image can be added to a set of features.

In some examples, identifying the defect includes calculating a remaining portion of the defect based on pairs of chained features from the set of chained features. Identifying the defect can include, for each pair of chained features from the set of chained features, determining if the pair of chained features satisfies a first criterion indicative of the pair of chained features being on a same defect in the solar cell, and calculating a remaining portion of the same defect between the pair of the chained features, wherein the same defect is a portion of the defect.

In other examples, a representation of the defect is displayed on the image of the solar cell. Selecting the set of chained features can include selecting a sub-image based on the set of features, identifying one or more sub-images that border the selected sub-image, each identified sub-image including a feature, and generating a chained feature comprising the selected sub-image and a sub-image from the one or more identified sub-images based on one or more constraints.

The techniques, which include both computerized methods and apparatuses, described herein can provide one or more of the following advantages. The search for strong features in an image of the material can be configured to have a high threshold such that weak features (e.g., features that can not be easily detected with a high degree of certainty) are quickly ruled out. Advantageously, the search for strong features can be performed quickly, and then the strong features can be used to search in a more detailed manner (e.g., with a lower threshold such that weak features can be identified) since the strong features are used as a baseline for the search of weak features. Further, the original image being searched for defects can be filtered and/or processed (e.g., to remove weak features and/or other noise) such that strong features can be quickly and easily identified. Additionally, separately identified strong features can be joined together to form a contiguous chained strong feature to define a larger portion of the defect.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other aspects, features, and advantages of the present invention, as well as the invention itself, will be more fully understood from the following description of various embodiments, when read together with the accompanying drawings.

DETAILED DESCRIPTION

In general, computerized systems and methods are provided for using machine vision to detect and inspect a material (e.g., a solar cell) for defects (e.g., micro cracks). An original image (e.g., an image of a solar cell) is preprocessed to generate a preprocessed image that contains mostly strong features of one or more defects. The strong features of the one or more candidate defects are detected using the preprocessed image. The strong features and/or the original image are then used to guide the detection of the weak features of the candidate defect. The strong features and the weak features are then combined to define the complete set of actual defects in the material (e.g., a set of strong features are combined with an associated set of weak features to define an actual defect).

For example, strong features of a crack (e.g., portions of a crack easily identifiable using machine vision) are identified using a preprocessed image that exposes the strong features. Detecting the strong portions of the full crack results in only part of the full crack being identified. For example, the detected portions of the crack can be thought of as a dotted line, with the solid portions of the dotted line representing detected strong features, and the white portions of the dotted line representing the undetected weak features. These identified strong features of the crack (e.g., the solid portions of the dotted line) are used to guide detection of the remaining weak features (e.g., the white portions of the dotted line).

A feature can include, for example, data indicative of a position and an angle, a length (e.g., a line segment), and/or additional information, such as polarity and contrast. The feature can be used (e.g., in decision-making points of the computerized methods described herein) to identify defects, or portions thereof. The computerized systems and methods can identify candidate defects by identifying portions of the candidate defects (e.g., by identifying strong features that may be indicative of a defect). The computerized systems and methods can use the identified portions to search for remaining portions of the candidate defects (e.g., weak features), to determine whether the candidate defect is an actual defect.

Although examples herein are directed to embodiments involving the detection of cracks in a polycrystalline solar cell, the described computerized systems and methods are not so limited and can be applied to detecting defects in other types of materials (or products), such as silicon wafers, printed circuit boards, and/or any other type of material.

Figure 1:
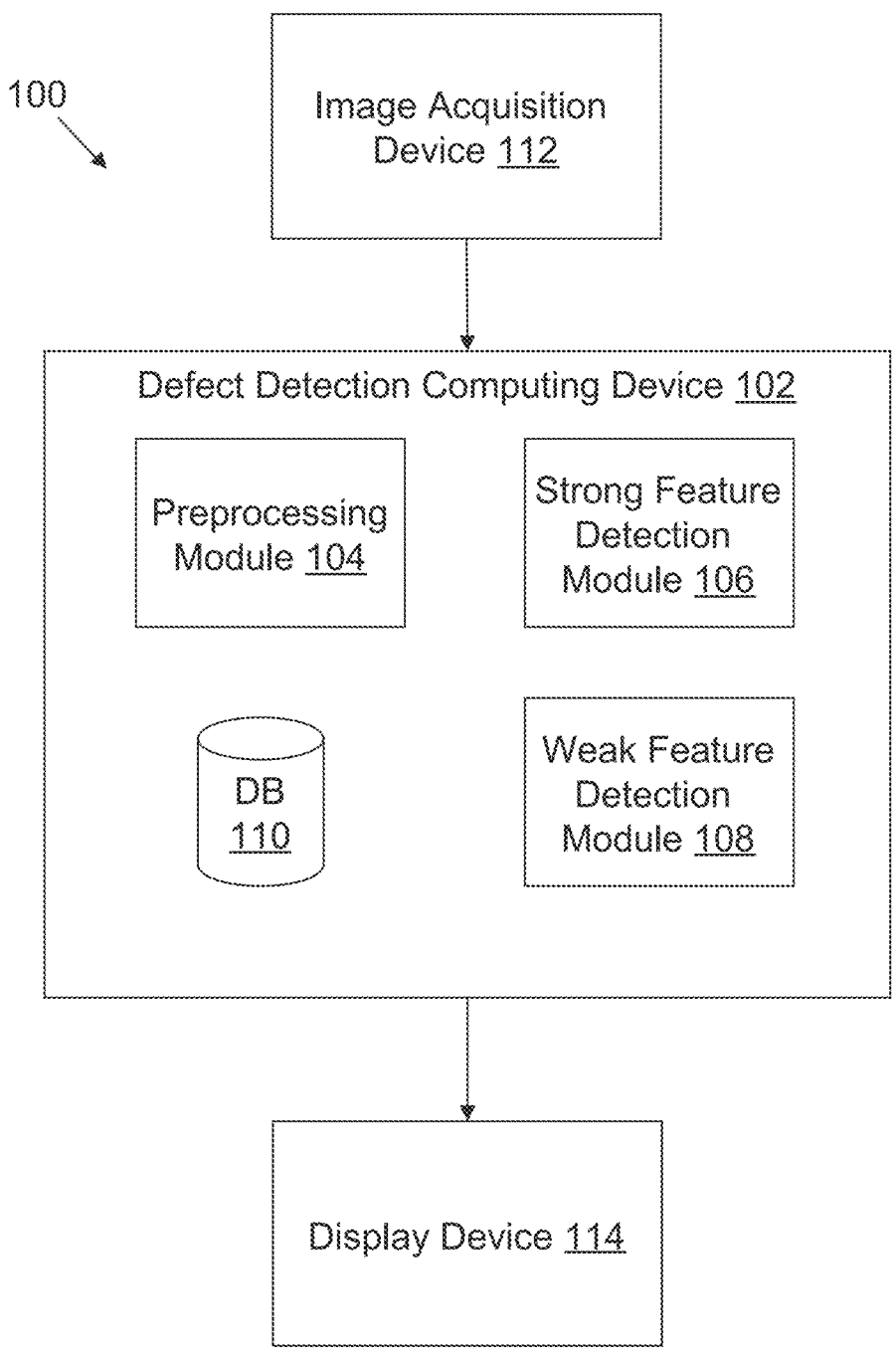
FIG. 1 is an exemplary computerized system for detecting defects in a material.

FIG. 1 is an exemplary computerized system 100 for detecting defects in a material. The system 100 includes a defect detection computing device 102 (defect detection device 102) that is in communication with an image acquisition device 112 and a display device 114. The defect detection device 102 includes a preprocessing module 104, a strong feature detection module 106, a weak feature detection module 108, and a database 110. The defect detection device 102 can include a processor and memory configured to identify defects in a material.

The system 100 is an example of a computerized system that is specially configured to perform the computerized methods described herein. However, the system structure and content recited with regard to FIG. 1 are for exemplary purposes only and are not intended to limit other examples to the specific structure shown in FIG. 1. As will be apparent to one of ordinary skill in the art, many variant system structures can be architected without departing from the computerized systems and methods described herein.

In addition, information may flow between the elements, components and subsystems described herein using any technique. Such techniques include, for example, passing the information over a network using standard protocols, such as TCP/IP, passing the information between modules in memory and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the invention.

The image acquisition device 112 can be any type of image capturing device (e.g., a two dimensional camera, a three dimensional camera, a photodetector, and/or the like) configured to capture images of the materials to be inspected by the defect detection device 102. For example, the image acquisition device 112 can be located above a conveyor belt of a fabrication process, where the image acquisition device 112 captures images of a representative number of fabricated materials for inspection.

The display device 114 displays images received from the defect detection device 102 (and/or from the image acquisition device 112). For example, the display device 114 can display original images captured by the image acquisition device 112, preprocessed images generated by the preprocessing module 104, and/or images with highlighted defects (e.g., highlighted with lines, colors, text, or other highlighting means). The display device 114 can be, for example, a computer monitor or a television screen. The display device 114 can further include an interface (e.g., a mouse, keyboard, or other data input device) for an operator to interface with the defect detection device 102.

The preprocessing module 104 exposes features in received images (e.g., including weak features and strong features). For example, the preprocessing module 104 executes a smoothing function (e.g., using median filtering) to remove features and/or noise to generate a filtered image. The preprocessing module 104 can generate a preprocessed image based on the original image and the filtered image (e.g., by subtracting the filtered image from the original image) to expose features in the original image. The preprocessing module 104 can, in some embodiments, be configured to not perform any preprocessing on original images received from the image acquisition device 102.

The strong feature detection module 106 extracts strong features of candidate portions of defects (or portions of features) based on the output of the preprocessing module 104 (e.g., local features based on sub-images). For example, the strong feature detection module 106 can search images for candidate portions of defects that can be quickly and/or easily identified, with a high degree of certainty (or a low number of false positives). The weak feature detection module 108 detects, based on the extracted strong features, weak features of defects that would otherwise be associated with a low degree of certainty (e.g., because the weak features have low contrast, non-uniform polarity or width, etc., making detection of the weak features both difficult and time consuming). Advantageously, because the search for weak features is guided by the known strong features, the risk of false positives is reduced and a time savings is achieved by not searching potential weak features if they are not associated with known strong features. The preprocessing module 104, strong feature detection module 106 and weak feature detection module 108 is described in further detail below with reference to FIGS. 3 and 4.

Figure 2A:
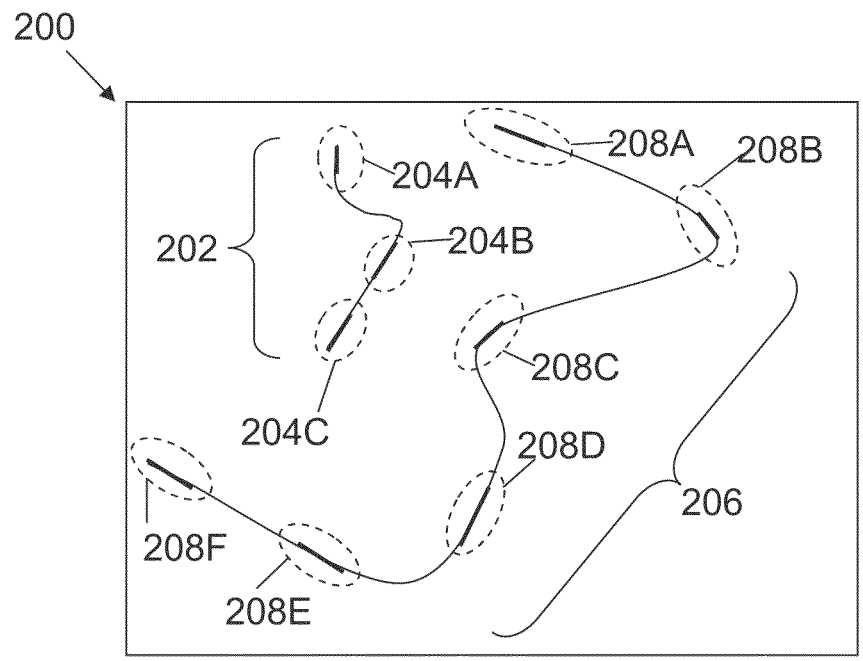
FIG. 2A is an exemplary image of a material with two defects.

FIG. 2A is an exemplary image 200 of a material with two defects 202 and 206, respectively (e.g., two cracks in the material). Defect 202 includes strong features 204A, 204B and 204C (collectively, strong features 204). For example, the strong features are larger portions of the defect that can be easily identified. The remaining portions of defect 202 are weak features (e.g., features not as easily identified compared to strong features 204). Defect 206 includes strong features 208A, 208B, 208C, 208D, 208E and 208F (collectively, strong features 208). The remaining portions of defect 206 are weak features.

Figure 2B:
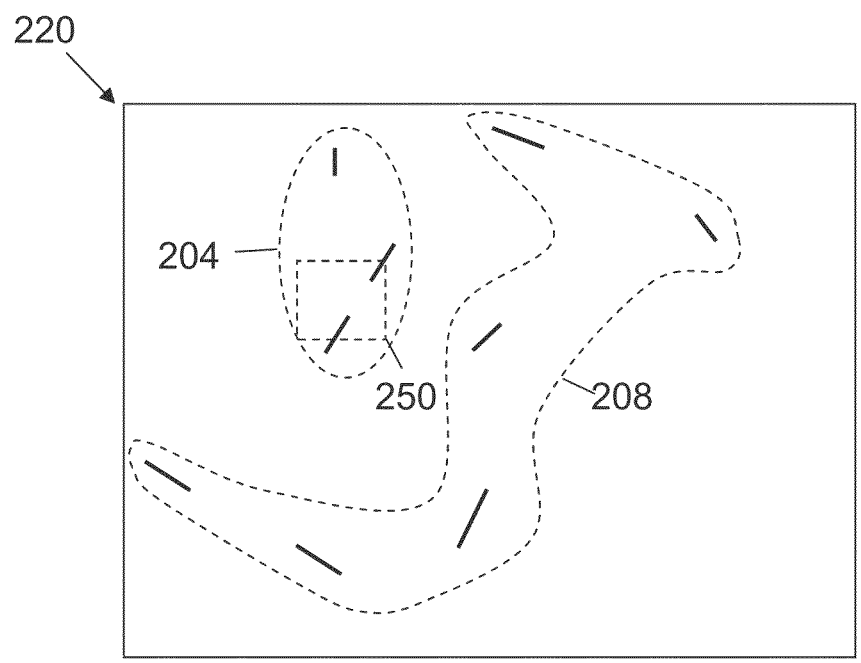
FIG. 2B is an exemplary preprocessed image generated based on the image of FIG. 2A.

FIG. 2B is an exemplary preprocessed image 220 generated based on the image 200 of FIG. 2A. For example, the preprocessing module 104 generates the preprocessed image 220 based on image 200. Preprocessed image 220 includes the strong features 204 of defect 202, and the strong features 208 of defect 206. The processed image 220 does not include the weak features of either defect 202 or 206. Portion 250 of preprocessed image 220 is described with further detail with reference to FIG. 2C.

Figure 2C:
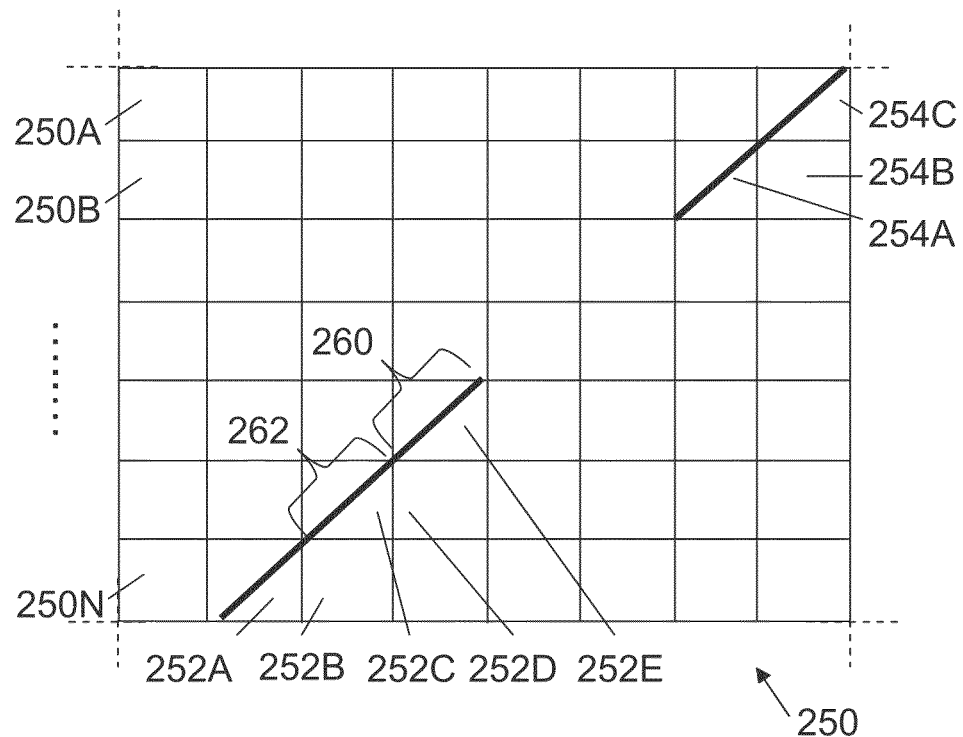
FIG. 2C is a magnified portion of the processed image of FIG. 2B, showing sub-images for the portion of the image.

FIG. 2C is a magnified portion 250 of the processed image 220 of FIG. 2B, showing sub-images for the portion 250 of processed image 220. The magnified portion 250 includes sub-images 250A, 250B through 250N (collectively, sub-images 250). Each sub-image represents a portion of the entire processed image 220. The size of each sub-image can be pre-configured (e.g., via an operator through the display device 114). For example, each sub-image can be configured to be 50 pixels wide by 50 pixels high, 40 pixels wide by 60 pixels high, etc. While FIG. 2C shows the sub-images as rectangular, non-overlapping, and contiguous blocks, this is for exemplary purposes only. The sub-images can be of any shape and can be mutually overlapping and/or noncontiguous. Sub-images 252A, 252B, 252C, 252D and 252E (collectively, sub images 252) each contain a portion of strong feature 204C. Sub-images 254A, 254B and 254C (collectively, sub images 254) each contain a portion of strong feature 204B. For example, sub-image 252C contains feature 262, and sub-image 252E contains feature 260. While FIG. 2C shows the features (e.g., features 260 and 262) mostly as diagonals across the sub-images, this is for exemplary purposes only. The features can, for example, be at any direction and/or orientation within the sub-images (e.g., as any geometric shape, such as straight lines, curved lines, ovals, rectangles, etc.).

Figure 2D:
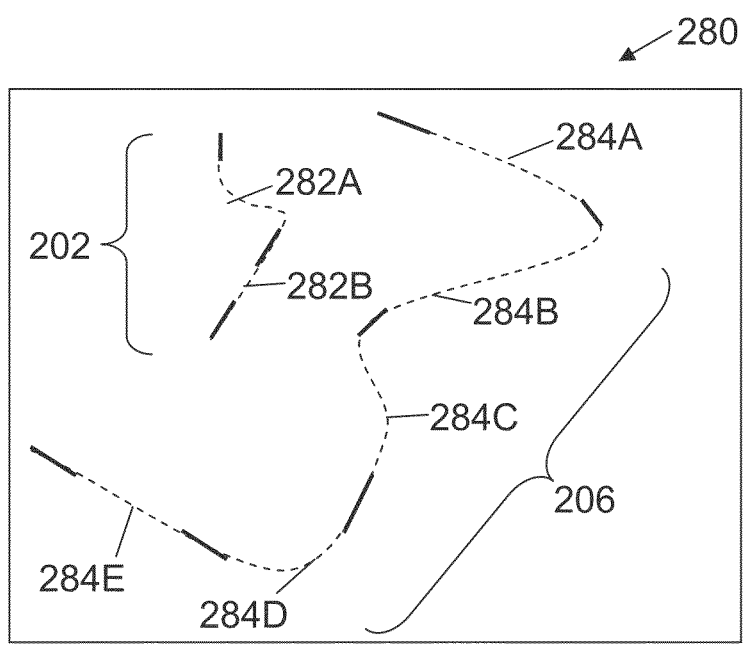
FIG. 2D is an exemplary image of the small portions of defects generated based on the strong features for the defects and in FIG. 2A.

FIG. 2D is an exemplary image 280 of the small portions of defects generated based on the strong features 204 and 208 for the defects 202 and 206 in FIG. 2A. For defect 202, strong features 204 (e.g., as shown in FIG. 2B) are used to guide detection of weak features 282A and 282B (collectively, weak features 282). For defect 206, strong features 208 are used to guide detection of weak features 284A, 284B, 284C, 284D and 284E (collectively, weak features 284). Defect 202 is made up of strong features 204 and weak features 282, and defect 206 is made up of strong features 208 and weak features 284 (e.g., detection of the strong and weak features of a defect results in detection of the entire defect, as is explained in further detail below).

Figure 3:
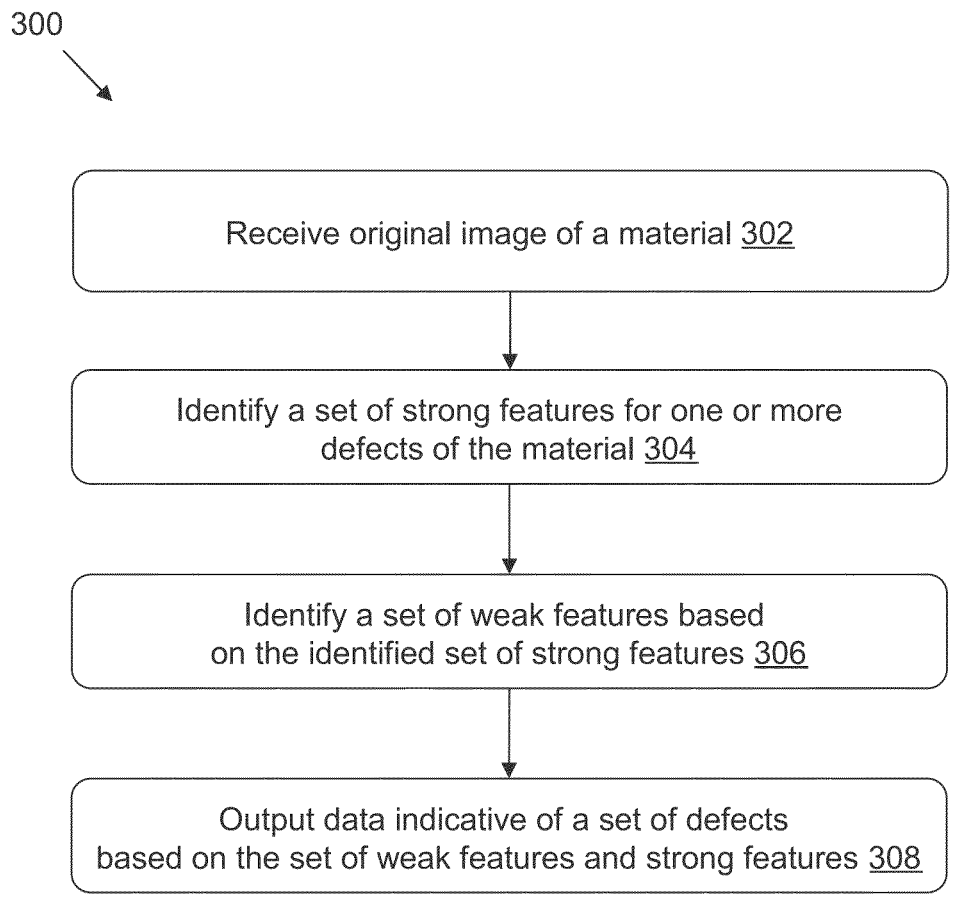
FIG. 3 is a diagram of an exemplary method for identifying defects in a material.

FIG. 3 is a diagram of an exemplary method 300 for identifying defects in a material. Referring to FIGS. 2A-2D, at step 302 the defect detection device 102 receives an image (e.g., image 200 or image 220) of a material from the image acquisition device 112. At step 304, the strong feature detection module 106 identifies (or detects) a set of strong features (strong features 204 and 208) for one or more defects 202, 204 in the image of the material. At step 306, the weak feature detection module 108 identifies a set of weak features 282, 284 in the image based on the identified set of strong features 204, 208. At step 308, the defect detection device 102 outputs data indicative of a set of defects 202, 206 based on the set of weak features 282, 284 and the set of strong features 204, 208 in the material.

Figure 5:
FIG. 5 is an exemplary diagram of a polycrystalline solar cell with a non-uniform appearance.

For example, the defect detection device 102 can identify a crack in a polycrystalline solar cell. FIG. 5 is an exemplary diagram of a polycrystalline solar cell 500 with a non-uniform appearance. The polycrystalline solar cell 500 includes a non-uniform appearance with features that include different contrast, polarity, width, etc. (e.g., features 502 and 504, which are not defects in the solar cell 500). Defect detection devices may improperly classify features of polycrystalline solar cell 500 as defects (e.g., such as classifying feature 502 as a defect). Further, such features like 502, 504 make the search for and/or detection of defects more difficult, since often defect detection devices are configured to both detect and exclude non-defect features, which results in a large number of features being detected and/or analyzed by many defect detection devices. Advantageously, the defect detection device 102 can search for strong features of a defect and then using the strong features to guide detection of the weak features of the defect. This can allow the defect detection device 102 to quickly, efficiently, and accurately classify defects.

Referring to step 304, the method can include identifying a set of strong features for a set of any type of defect of the material (e.g., cracks, chips, manufacturing defects, and/or the like). Advantageously, the strong features of the defects can be identified quickly and with a high degree of success (a low chance of false identification of a non-defect feature), and then used to guide the search for weak features of the defects that would otherwise be identified slowly and with a low degree of success (e.g., since a system would not have any a priori information for the weak defects, the system would need to consider all features that could be weak features, and then classify them one-by-one as a defect or not).

Referring to step 304, the strong feature detection module 106 can divide the preprocessed image into sub-images 250, and search each sub-image 250 for portions of strong features. The strong feature detection module 106 can chain together the identified strong features in each sub-image to form a set of chained features. The strong feature detection module 106 can use the chained features (e.g., which represent a complete large defect) to search for weak features.

Figure 4:
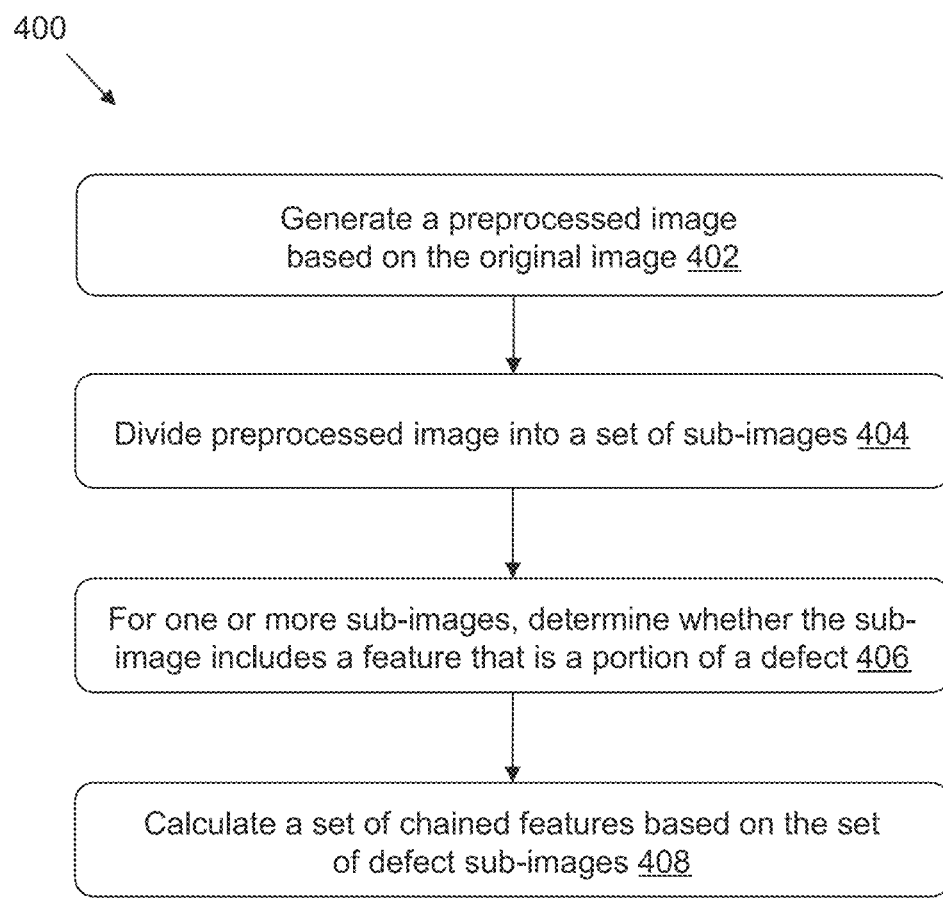
FIG. 4 is a diagram of an exemplary method for identifying a set of chained features for a portion of a candidate defect in a material.

FIG. 4 is a diagram of an exemplary computerized method 400 for identifying a set of chained features of a portion of a candidate defect in a material. Referring to FIGS. 2A-2D, at step 402 the preprocessing module 104 generates a preprocessed image 220 based on the original image 200 of the material, to remove one or more features of the material (e.g., to remove noise and/or weak features of the defects from the image). At step 404, the strong feature detection module 106 divides the preprocessed image 220 into a set of sub-images 250. At step 406, for one or more of the sub-images in the set of sub-images 250, the strong feature detection module 106 determines whether the sub-image includes a feature, wherein the feature is a portion of a defect in the material. For example, if the defect in the material is a crack, the strong feature detection module 106 determines whether the sub-image includes a line segment representing a candidate portion of the crack. If the sub-image includes the feature, the strong feature detection module 106 adds the sub-image to a set of feature sub-images (e.g., a set of one or more sub-images, each of which include a strong feature). At step 408, the strong feature detection module 106 calculates a set of chained features based on the set of feature sub-images. Each chained feature includes one or more features that represent portions of a same crack in the material.

Referring to step 402, the preprocessed image 220 removes background texture(s) so the strong feature detection module 106 can better identify the strong features (e.g., quicker, since the strong feature detection module 106 analyzes fewer features—only the strong features, and more accurately since the strong features are often easily-identifiable features of the defects). For example, polycrystalline solar cells often have heterogeneous textures, with an appearance as if the solar cell was made by melting together different polycrystalline pieces. Therefore, the preprocessed image 220 can remove the edge portions of the different polycrystalline pieces. Advantageously, removing such edge portions and/or other noise, which are not indicative of defects in the polycrystalline solar cell, allows the strong feature detection module 106 to quickly and easily identify strong features of defects without wasting processing time on non-defect (or potentially non-defect) weak features.

The preprocessing module 104 can generate the preprocessed image based on a filtered image. For example, the preprocessing module 104 can generate a filtered image by executing a filter on the original image 200 received from the image acquisition device 112. The filter can be, for example, a filter configured to retain background features and/or textures (e.g., noise and weak features) and remove strong features from the original image 200. For example, the filter can be a low-pass filter, a median filter, and/or a low-frequency smoothing function. The preprocessing module 104 can generate the preprocessed image 220 by subtracting the filtered image (or vice-versus) from the original image 200 to remove background textures in the original image, to remove one or more weak features in the original image, or both. In some embodiments, the preprocessing module 104 can execute a texture filter and use the output of the enhancement filter.

Referring to the preprocessed image 220, while FIG. 2B shows the background with white pixels and the strong features with black pixels, the preprocessed image can include a background of dark pixels and a set of strong features comprising light pixels, wherein the dark pixels and the light pixels are identified based on a grey-level threshold. For example, the defect detection device 102 can use a grey-level threshold to identify which pixels are associated with strong features. For example, if the background is black and pixel features are associated with lighter pixels, the defect detection device 102 can define a grey-level threshold where all pixels with a grey-level value greater than the grey-level threshold are determined to be representative of pixels potentially associated with strong features of a candidate defect, while pixels with a grey-level value less than the grey-level threshold are determined to not represent pixels potentially associated with strong features.

Referring to step 404, the preprocessed image 220 includes a set of strong features 204 and 208, and the strong feature detection module 106 needs to detect the strong features 204 and 208 and connect them together, if necessary, to form complete strong features. The strong feature detection module 106 divides the preprocessed image 220 into a set of sub-images 250 (e.g., to search for portions of strong features in each of the sub-images). In some embodiments, the strong feature detection module 106 does not actually break up the preprocessed image 220 into different data structures, but instead the strong feature detection module 106 considers certain groups of pixels in an iterative fashion. In some examples, the strong feature detection module 106 iteratively considers each sub-image in the preprocessed image 220. Since the strong feature detection module 106 identifies portions of features in each sub-image (e.g., portions of a strong feature), the strong feature detection module 106 can chain together the identified set of features in the sub-images to generate a complete feature (e.g., to generate a complete strong feature), which is described in further detail below.

Referring to step 406, the strong feature detection module 106 generates a set of feature sub-images, each feature sub-image including a feature (which may be only a portion of a full feature). For example, the strong feature detection module 106 analyzes one or more sub-images 250 to determine whether the sub-image includes a line segment (wherein the line segment is a candidate portion of a crack in the material). As an example, the strong feature detection module 106 determines sub-image 252E includes feature 260. The strong feature detection module 106 can add sub-image 252E to a set of feature sub-images. For example, if the strong feature detection module 106 analyzes the sub-images 250 of FIG. 2C, the set of feature sub-images would include at least sub-images 252A, 252C, 252E, 254A and 254C, since each of these sub-images includes a feature within it (e.g., each includes a line segment for a candidate portion of a crack). Further, if the strong feature detection module 106 determines sub-image 252B includes a feature (since the upper-left corner of sub-image 252B may include a feature), then the strong feature detection module 106 would add 252B to the feature.

In some embodiments, the strong feature detection module 106 can determine whether the sub-image includes a line segment by executing a line fitting algorithm. The line-fitting algorithm can be a lightweight tool (e.g., computationally inexpensive to computer processing resources) that takes as input a list of points (e.g., a minimum of two-dimensional points). The strong feature detection module 106 can analyze the pixels of each sub-image to determine which are input to the line fitting algorithm. For example, if the processed image 220 is configured such that the background pixels are dark pixels (e.g., wherein the dark pixels are identified based on a grey-level threshold value) and therefore the strong features are defined by lighter pixels (e.g., wherein the light pixels are identified based on a grey-level threshold value), the strong feature detection module 106 can execute a line fitting algorithm using the light pixels in a sub-image. For example, the strong feature detection module 106 can use a grey-level threshold to determine which pixels to input into the line fitting algorithm. In some examples, the strong feature detection module 106 can execute a line fitting algorithm using the dark pixels in the sub-image (and/or a combination of the light pixels and the dark pixels).

In some embodiments, the line fitting algorithm can return either (a) a line segment (e.g., a straight line segment that has a direction and/or a position) or (b) a null value indicative of the sub-image not including a line segment. The strong feature detection module 106 can add a sub-image to the set of feature sub-images (the set of sub images that include line segments) if the line fitting algorithm returns a line segment. Otherwise, the strong feature detection module 106 can omit the sub-image being analyzed (e.g., and proceed to analyze another sub-image).

In some embodiments, the strong feature detection module 106 determines whether a sub-image includes a feature based on a set of constraints (e.g., one or more constraints). The strong feature detection module 106 can determine whether the sub-image contains enough feature pixels (e.g., based on a minimum value, after grey-level thresholding pixels in the sub-image). The strong feature detection module 106 can calculate a feature fit error (e.g., if the feature is a line, whether a line fit error is below a threshold value). The strong feature detection module 106 can determine whether in the original image 200 the candidate feature in the sub-image has enough contrast in its orientation. The strong feature detection module 106 can determine whether in the original image 200 the candidate feature's brightness variation is small enough in the sub-image. The strong feature detection module 106 can determine whether in the original image 200 the candidate feature's thickness is within a thickness range (e.g., if the candidate feature is a line segment for a portion of a crack, it can use a crack thickness range).

In some embodiments, other tools besides line detecting tools can be used to detect short lines in the sub-images. For example, the Caliper Tool provided by Cognex of Natick, Mass. can be used to detect the two edges of a line. The Caliper Tool can measure, based on a given direction and position of the line, how in the image the grey-level changes across the line to determine the position of the line. If, for example, the direction of the line is not known, the Caliper Tool can iteratively test each direction in the sub-image, and using the strongest two edges to determine where the line is.

Referring to step 408, the strong feature detection module 106 determines whether to join together one or more identified features from step 406 (e.g., for crack defects, the strong feature detection module 106 can chain together neighboring crack features from the various sub-images to identify a complete defect feature). For example, the strong feature detection module 106 selects feature sub-image 252E from the set of feature sub-images. The strong feature detection module 106 identifies one or more sub-images that border the selected feature sub-image, each identified sub-image including a feature. For example, feature sub-image 252E may have eight sub-images that border it (e.g., the sub-images that are to the top, bottom, left, right, and the four corners). Feature sub-image 252C borders sub-image 252E because the upper-right corner of feature sub-image 252C is adjacent to the lower left corner of feature sub-image 252E. The strong feature detection module 106 generates a chained feature comprising the feature sub-image 252C and feature sub-image 252E (e.g., and therefore features 260 and 262 are joined together to form a chained feature). Advantageously, the strong feature detection module 106 can join together separately calculated features to form a contiguous chained feature.

The strong feature detection module 106 can identify chained features based on one or more constraints to ensure that features are chained together into a single chained feature only if they represent candidate portions of a same defect (e.g., of a crack). The one or more constraints can include a position, an orientation, or both, of the features the strong feature detection module 106 is analyzing. For example, for candidate line segment portions of a crack in adjacent sub-images, the strong feature detection module 106 is configured to chain the line segments together. Advantageously, the strong feature detection module 106 can chain together separate line segments as long as possible (e.g., into a curved line) to define a large candidate portion of a crack.

The strong feature detection module 106 can start the chaining process from a cell in which there is a feature (e.g., a feature sub-image). The strong feature detection module 106 can analyze the adjacent cells of the feature sub-image (e.g., the eight adjacent sub-images) based on constraints to potentially chain the feature sub-image together with one or more neighboring sub-images. For example, a constraint can include verifying that the direction of the features in the neighboring sub-images are compatible (e.g., verifying that a line is continued from one line segment to another line segment instead of chaining together two line segments that would be parallel).

The strong feature detection module 106 can analyze neighboring sub-images based on whether or not the neighboring sub-images include a feature. For example, if a selected feature sub-image one has one neighboring sub-image with a feature, then the strong feature detection module 106 can connect the two features in the respective sub-images. The strong feature detection module 106 can then analyze the neighboring sub-images of the newly chained sub-image (e.g., using the same process used to analyze the initial sub-image.

If, for example, the selected sub-image has multiple neighboring sub-images with features, then the strong feature detection module 106 can select which of the multiple sub-images to chain together with the selected sub-image based on a scoring mechanism to tell which is the best candidate around its neighboring sub-images (e.g., along its four sides and four corners). For example, known information about each feature in the sub-images can be used, such as a position of the feature in the sub-image (e.g. the mid-point of the feature) and an angle of direction of the feature. The chaining algorithm can use a score to measure how well the information of the feature of the current sub-image matches (or pairs) with the feature(s) in a neighboring sub-image(s). The strong feature detection module 106 can pick the neighboring feature with the best score to chain with the current feature. The strong feature detection module 106 can consider as the next feature the selected neighboring feature to look for any additional features to chain together with the neighboring feature. The score can be calculated based on, for example, how much a feature has to "turn" in order to connect with a neighboring feature. For example, since cracks in a material are often locally straight (e.g., without many high-curvature turns), features with a large turn can be disregarded. For example, the following turning angle scoring function can be used:

$$S=|A_C-A_T|+|A_T-A_N| \quad \text{Equation 1}$$

Wherein:
S=the turning angle score for the current feature (the feature being analyzed);
$A_C$=the angle of current feature;
$A_N$=the angle of a neighboring feature of the current feature; and
$A_T$=the angle of the turning line segment, which is the line segment that starts at the mid-point of the current feature and ends at the mid-point of the neighboring feature.

Regarding $A_C$ and $A_T$, the angle can be indicative of a direction of a line in the image coordinate system (e.g., the angle can be measured by the angle formed by the current feature and the x-axis of the coordinate system). A low score (S) of 0 means the current feature does not have any "turning" when connecting the current feature to the neighboring feature (e.g., the end point of the current feature can be connected to the beginning point of the neighboring feature using a straight line). A high score (S) means the current feature has a high "turning" angle when connecting the current feature to the neighboring feature. The strong feature detection module 106 can select the neighboring feature with the smallest score as the next feature to analyze.

In some embodiments, after the strong feature detection module 106 chains together the strong features, there can be a number of disjoint chained features (e.g., strong features 204 and 208). However, as shown in original image 200, the strong features 204 are all part of the same defect 202, and the strong features 208 are all part of the same defect 206. The strong feature detection module 106 only detected and chained together the strong features, but the weak features of each defect (weak features 282 and 284) were not yet identified. Advantageously, as is described in FIG. 3, the weak feature detection module 108 uses strong features to guide detection of the weak features (e.g., the weak feature detection module 108 uses strong features 204 and 208 to guide detection of weak features 282 and 284, respectively).

Referring to step 306, the weak feature detection module 108 calculates the set of weak features for defects based on the identified set of strong features from step 304. In some embodiments, the weak feature detection module 108 identifies a defect (e.g., defect 202 and 206) based on a pair of chained features from the set of chained features. The weak feature detection module 108 can recursively search for pairs of chained features of a defect to use to detect weak features of the same defect. For example, the weak feature detection module 108 can determine if a selected pair of chained features satisfies a criterion indicative of the pair of chained features being on a same defect (e.g., to determine that strong features 204A and 204B are on a same defect 202, while strong features 204A and 208A are on different defects 202 and 206, respectively). The criterion can be based on, for example, a distance between the pair of chained features (e.g., the pixel distance between an end point on strong feature 204A and an end point on strong feature 204B), an end direction of each feature in the pair of chained features (e.g., the linear direction of an endpoint on a strong feature), a turning angle of each feature in the pair of chained features (e.g., based on Equation 1), a length of each feature in the pair of chained features (e.g., the number of pixels along strong feature 204A and on strong feature 204B), and/or other criterion indicative of whether the pair of features are part of a same defect.

The weak feature detection module 108 can choose pairs of chained features (or strong features) using a selection algorithm that scores candidate pairs of strong features (e.g., and select the highest-scored pair of strong features). The weak feature detection module 108 can score pairs based on the distance between the ends of one chained feature and the ends of the other chained feature (e.g., the weak feature detection module 108 may not consider two chained features if the endpoints are too far apart). The weak feature detection module 108 can score pairs based on the end direction of the chained features (e.g., based on the last two points of each chained feature). For example, if the chained feature is a line segment of a portion of a crack, the line segment may be a curve and therefore have no fixed direction, but the tangential direction of both ends of the line segment can be calculated and compared against the tangential direction of the other chained feature being compared with. The weak feature detection module 108 can score pairs based on the turning angle of the chained features.

The weak feature detection module 108 can choose pairs of chained features based on the endpoints of each chained feature (referred to herein as "chain ends," where each chained feature includes a head and a tail end). A chain end can include, for example, a single pixel or more than one pixel (e.g., the chain end can be the entire feature that belongs to the sub-image that makes up the end portion of the strong feature). For a given set of N chained features, there are a total of (2*N) chain ends. To determine which chain end should be paired with another chain end, the weak feature detection module 108 can execute an algorithm to select the best candidate chain ends.

For example, in some embodiments the algorithm can proceed as follows. Before any chain ends are analyzed, there is an initial pool of (2*N) chain ends. The weak feature detection module 108 selects a chain end and compares the selected chain end with the remaining chain ends to determine whether one of the chain ends is pairable with the selected chain end. In some embodiments, the weak feature detection module 108 can be configured to not exhaust searching all existing chain ends before picking a pair of chain ends. For example, for a given chain end, the weak feature detection module 108 can search for other chain ends and pick a second chain end as soon as the weak feature detection module 108 finds a pairable one (which is described in further detail below). In some embodiments, the weak feature detection module 108 is configured to exhaustively search each potential set of chain ends and to select the best pair of chain ends. For example, a unified score could be designed to take into account various features of each pair of chain ends (e.g., both the chain end distance and collinearity, as discussed further below). The weak feature detection module 108 could exhaustively evaluate all other chain ends, calculating the unified score for each, and then pick the chain ends with the best score.

The weak feature detection module 108 can determine whether two chain ends are pairable based on one or more tests, such as a distance test, a turning angle test, and/or any other test that can provide and/or determine information about the pair ends. For example, the weak feature detection module 108 can execute a distance test that determine whether the distance of the end points of the two chain ends is less than a maximum distance threshold (the maximum distance threshold can be preconfigured (or hardcoded), provided by an operator, etc.). If the distance is less than the maximum distance threshold, the weak feature detection module 108 can determine the pair of chain ends satisfies the distance test, otherwise the weak feature detection module 108 rejects the two chain ends as not pairable.

As another example, the weak feature detection module 108 can examine the collinearity of the two chain ends. For example, the weak feature detection module 108 can determine how collinear the first few features at the two chain ends are (e.g. by measuring the fit error of a straight line fitting the first few feature points, and/or by measuring how far these features deviate from a line segment that connects the two chain ends). As another example, the weak feature detection module 108 can determine collinearity by executing a turning angle test to determine whether the turning angle score for the two chain ends is less than a maximum turning angle score threshold. If the turning angle score is less than the maximum turning angle score threshold, the weak feature detection module 108 can determine the pair of chain ends satisfies the turning angle test, otherwise the weak feature detection module 108 rejects the two chain ends as not pairable. The turning angle score can be calculated, for example, using Equation 1 above. In some examples, the turning angle score is calculated using Equation 2:

$$S=|A_C-A_T|+|A_T-A_N|$$ Equation 2

Wherein:

S=the turning angle score for the first chain end of the two chain ends;

$A_C$=the tangential angle of first chain end;

$A_N$=the tangential angle of the second chain end of the two chain ends; and $A_T$=the angle of the line segment, which is the line segment that starts at the end point of the first chain end and ends at the mid-point of the second chain end.

The weak feature detection module 108 can use a combination of tests to determine whether two chain ends are pairable. For example, the weak feature detection module 108 can use both the distance test and the collinearity test to determine whether two chain ends are pairable (e.g., if the weak feature detection module 108 determines one or more of the two tests is not satisfied, the weak feature detection module 108 rejects the two chain ends as not pairable). Advantageously, the weak feature detection module 108 can be configured to define pairability as (a) including undetected portions of the defect that are not too large (e.g., weak segments (or portions) of a crack are not too long) and (b) the defects do not include features that are unlikely to define a defect (e.g., the algorithm can be configured to pair portions of a crack that tend to extend, instead of making turns, since cracks with sharp turns and/or zigzag turns are unlikely).

If a pairable chain end is found, the weak feature detection module 108 next determines whether the two chain ends can actually be paired. If the pairing is successful (e.g., if the weak feature detection module 108 detects one or more weak features between the paired strong features), the weak feature detection module 108 joins the two chained features (e.g., with any intermediate features) to form a new chain. The two chain ends (which the weak feature detection module 108 connected) are removed from the pool of chain ends.

The weak feature detection module 108 can repeat the above-described steps of the algorithm for a next selected chain end in the pool (e.g., which now has (2*(N−1)) chain ends). The weak feature detection module 108 can be configured to complete the search for pairable chain ends when there are no chain ends left in the pool, or when the weak feature detection module 108 determines all remaining chain ends cannot be paired with any other chain ends.

The weak feature detection module 108 can calculate the remaining portion of the same defect between the pair of the chained features. For example, for defect 202, the weak feature detection module 108 calculates weak feature 282A based on strong features 204A and 204B, and calculates weak feature 282B based on strong features 204B and 204C. For example, if defect 202 is a crack, the feature detection module 106 calculates chained line segments for strong crack features 204, and uses the strong crack features 204 to guide identification of the weak crack features 282, resulting in identification of the full crack 202.

Advantageously, the strong feature detection module 106 can be configured to detect only strong features, and the weak feature detection module 108 can be configured to use the detected strong features to detect the undetected weak features. For example, the strong feature detection module 106 may be unable to detect the weak features because it has certain parameters configured to ensure the module detects only defect features and not other features (e.g., and not non-defect features, such as heterogeneous textures of a solar cell). Therefore, the strong feature detection module 106 can be configured to not detect weak features and/or noise.

In some embodiments, the weak feature detection module 108 uses the original image 200 to detect weak features (e.g., instead of using the preprocessed image 220). The weak feature detection module 108 can use the original image 200 instead of the preprocessed image 220 because weak features may have a low contrast in the preprocessed image 220 (e.g., due to filtering by using the median filter to alter the pixels of the original image 200). Advantageously, the strong feature detection module 106 can quickly search for the strong features (e.g., because searching the preprocessed image 220 requires processing less data and because the strong feature detection module 106 can be configured to stop processing data (e.g., a sub-image) if constraints are not met, allowing a more cursory review of the data to be sufficient). The weak feature detection module 108 can be configured to perform a more detailed search of the original image 220 because the strong features of the defects have been detected, which are used to guide searches for weak features of the defects (e.g., and therefore, while other weak features may be present in original image 200, the weak feature detection module 108 may only consider the weak features identified based on the detected strong features).

In some embodiments, the weak feature detection module 108 uses constraints that are more relaxed than those used by the strong feature detection module 106 to detect the weak features. In some embodiments, different tools are used by the strong feature detection module 106 and the weak feature detection module 108 to detect the weak the weak features. For example, the strong feature detection module 106 can use the Caliper Tool discussed above. The weak feature detection module 108 has knowledge of what the direction is in the weak features based on the surrounding strong features (e.g., strong feature 204C extends into weak feature 282B). The Caliper Tool can be applied in the expected area (e.g., where weak feature 282B is expected). The Caliper Tool can report (a) if strong enough, the location of the weak feature (e.g., the location of the weak feature 282B of the defect 202), and/or (b) nothing (e.g., because there is no match, such as searching for a portion of defect 202 below strong feature 204C). The Caliper Tool can detect the weak feature 282B pixel-by-pixel (e.g., by detecting the first pixel adjacent to strong feature 204C, and then iteratively searching for each next pixel based on the previous pixel).

In some embodiments, the weak feature detection module can be configured to search less candidate pixels if the candidate pixels are closer to known strong features (e.g., at the end points of a weak feature), and to search more candidate pixels if the candidate pixels are further away from the strong features (e.g., at the center of the weak feature). For example, a paired set of strong features with a space between the two strong features can give a hint that the end portions of the weak feature near the strong features should appear near the adjoining ends of the large features, whereas in the middle of the weak feature, it is less known where that portion of the weak feature is located (e.g., the weak feature may be a curve, so in the middle that portion of the weak feature may be in an unexpected location).

Regarding step 308 of FIG. 3, the defect detection device 102 assembles the detected weak features and strong features together to identify actual defects. For example, the defect detection device 102 assembles the strong features 204 with the weak features 282 to identify defect 202 (e.g., a full crack in a solar cell).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method for identifying a defect in a material, comprising:
   generating, by a computing device, a preprocessed image based on an original image of a material;
   dividing, by the computing device, the preprocessed image into a set of sub-images;
   for a first sub-image in the set of sub-images:
      determining, by the computing device, whether the first sub-image includes a feature, wherein the feature is a candidate portion of a defect in the material; and
      if the first sub-image includes the feature, adding, by the computing device, the first sub-image to a set of feature sub-images;
   selecting, by the computing device, a chained feature based on the set of feature sub-images, wherein the chained feature comprises one or more features that represent candidate portions of a same defect in the material; and
   identifying, by the computing device, a defect in the material based on the chained feature and the original image, comprising calculating a remaining portion of the defect based on the chained feature,
   wherein identifying the defect comprises:
      selecting a pair of chained features comprising the chained feature;
      determining if the pair of chained features satisfies a first criterion indicative of the pair of chained features being on a same defect in the material; and
      calculating a remaining portion of the same defect between the pair of the chained features.

2. The method of claim 1, wherein generating the preprocessed image comprises:
   generating a filtered image, comprising removing one or more features using a filter; and
   generating the preprocessed image by subtracting the filtered image from the original image to expose the one or more features in the original image.

3. The method of claim 1, wherein the preprocessed image is the original image.

4. The method of claim 1, wherein the preprocessed image exposes one or more features of the material.

5. The method of claim 1, wherein the preprocessed image comprises dark pixels and light pixels, wherein the dark pixels and the light pixels are identified based on a grey-level threshold.

6. The method of claim 5, wherein determining whether the sub-image includes the feature comprises executing a line fitting algorithm using the light pixels, the dark pixels, or both, in the sub-image.

7. The method of claim 1, further comprising:
   determining the feature satisfies a first set of criterions; and
   determining the chained features and the calculated remaining portion of the defect satisfy a second set of criterions.

8. The method of claim 1, wherein selecting the chained feature comprises:
   selecting a feature sub-image from the set of feature sub-images;
   identifying one or more sub-images that border the selected feature sub-image, each identified sub-image including a feature; and
   generating a chained feature comprising the selected feature sub-image and a sub-image from the one or more identified sub-images based on one or more constraints.

9. The method of claim 8, wherein the one or more constraints comprises a position, an orientation, or both, of the one or more features.

10. The method of claim 1, wherein the first criterion is based on a distance between the pair of chained features, an end direction of each feature in the pair of chained features, a turning angle of each feature in the pair of chained features, a length of each feature in the pair of chained features, or any combination thereof.

11. A computer program product, tangibly embodied in a non-transitory computer readable medium, the computer program product including instructions being configured to cause a data processing apparatus to:
   generate a preprocessed image based on an original image of a material;
   divide the preprocessed image into a set of sub-images;
   for a first sub-image in the set of sub-images:
      determine whether the first sub-image includes a feature, wherein the feature is a candidate portion of a defect in the material; and
      if the first sub-image includes the feature, add the first sub-image to a set of feature sub-images;
   select a chained feature based on the set of feature sub-images, wherein the chained feature comprises one or more features that represent candidate portions of a same defect in the material; and
   identify a defect in the material based on the chained feature and the original image, comprising calculating a remaining portion of the defect based on the chained feature,
   wherein identifying the defect comprises:
      selecting a pair of chained features comprising the chained feature;
      determining if the pair of chained features satisfies a first criterion indicative of the pair of chained features being on a same defect in the material; and
   calculating a remaining portion of the same defect between the pair of the chained features.

12. An apparatus for identifying a defect in a material, comprising:
   a preprocessing module configured to generate a preprocessed image based on an original image of a material;
   a strong feature detection module in communication with the preprocessing module configured to:
      divide the preprocessed image into a set of sub-images; and
      for a first sub-image in the set of sub-images:
         determine whether the first sub-image includes a feature, wherein the feature is a candidate portion of a defect in the material; and
         if the first sub-image includes the feature, add the first sub-image to a set of feature sub-images; and
   a weak feature detection module in communication with the strong feature detection module configured to:
   select a chained feature based on the set of feature sub-images, wherein the chained feature comprises one or more features that represent candidate portions of a same defect in the material; and
   identify a defect in the material based on the chained feature and the original image, comprising calculating a remaining portion of the defect based on the chained feature,
   wherein identifying the defect comprises:
      selecting a pair of chained features comprising the chained feature;

determining if the pair of chained features satisfies a first criterion indicative of the pair of chained features being on a same defect in the material; and calculating a remaining portion of the same defect between the pair of the chained features.

* * * * *